(12) United States Patent
Anderson et al.

(10) Patent No.: US 10,077,197 B2
(45) Date of Patent: Sep. 18, 2018

(54) HIGH CONCENTRATION BLEACH GENERATOR APPARATUS, SYSTEM AND METHOD OF USE

(71) Applicants: Michael J. Anderson, Dumfries, VA (US); Clint B. Smith, Chantily, VA (US); Andmorgan R. Fisher, Haymarket, VA (US); Tung Ly, Lorton, VA (US)

(72) Inventors: Michael J. Anderson, Dumfries, VA (US); Clint B. Smith, Chantily, VA (US); Andmorgan R. Fisher, Haymarket, VA (US); Tung Ly, Lorton, VA (US)

(73) Assignee: THE UNITED STATES OF AMERICA AS REPRESENTED BY THE SECRETARY OF THE ARMY, Washington, DC (US)

(*) Notice: Subject to any disclaimer, the term of this patent is extended or adjusted under 35 U.S.C. 154(b) by 364 days.

(21) Appl. No.: 14/717,407

(22) Filed: May 20, 2015

(65) Prior Publication Data

US 2018/0065868 A1    Mar. 8, 2018

(51) Int. Cl.
| | | |
|---|---|---|
| C25B 1/46 | (2006.01) | |
| C25B 1/26 | (2006.01) | |
| C02F 1/461 | (2006.01) | |
| C02F 1/467 | (2006.01) | |
| C25B 15/02 | (2006.01) | |
| C25B 13/04 | (2006.01) | |

(52) U.S. Cl.
CPC ........ *C02F 1/4674* (2013.01); *C02F 1/46104* (2013.01); *C25B 1/46* (2013.01); *C25B 13/04* (2013.01); *C25B 15/02* (2013.01); *C02F 2201/46115* (2013.01); *C02F 2201/46135* (2013.01); *C02F 2303/04* (2013.01)

(58) Field of Classification Search
CPC ....................................................... C25B 1/46
USPC .................................. 205/500, 516; 96/4–14
See application file for complete search history.

(56) References Cited

U.S. PATENT DOCUMENTS

| | | | | | |
|---|---|---|---|---|---|
| 3,620,844 | A | * | 11/1971 | Wicke | ..................... C01B 3/503 |
| | | | | | 423/658.2 |
| 3,761,382 | A | * | 9/1973 | Hammond | .............. C01B 3/501 |
| | | | | | 204/260 |
| 3,948,737 | A | * | 4/1976 | Cook, Jr. | .................. C25B 1/46 |
| | | | | | 205/535 |
| 4,057,474 | A | * | 11/1977 | Kurtz | ........................ C25B 1/46 |
| | | | | | 204/255 |

(Continued)

*Primary Examiner* — Harry D Wilkins, III
(74) *Attorney, Agent, or Firm* — Brian C. Jones

(57) ABSTRACT

The present invention provides a high concentration bleach generator apparatus and a system and method for its use. The apparatus includes a housing containing brine, anionic and cationic chambers. Electrodes in the anionic and cationic chambers separate salt from brine into hydrogen gas, chlorine gas and an alkali and alkaline hydroxide mass. The hydrogen gas vents through a hydrogen selective membrane. A pump conveys the chlorine gas to the cationic chamber, where it combines with the alkali and alkaline hydroxide mass to form a bleach solution. Users can draw off the bleach and use it to disinfect water. The system also provides a system housing, a larger brine reservoir and a data processor allowing a user to select a desired bleach concentration for production.

20 Claims, 4 Drawing Sheets

(56) References Cited

U.S. PATENT DOCUMENTS

| | | | | |
|---|---|---|---|---|
| 4,308,123 A * | 12/1981 | Lynn | ............... | C25B 15/00 204/263 |
| 4,468,235 A * | 8/1984 | Hill | ............... | C01B 3/00 95/46 |
| 4,496,373 A * | 1/1985 | Behr | ............... | B01D 53/22 205/354 |
| 4,552,631 A * | 11/1985 | Bissot | ............... | C08J 5/2281 204/252 |
| 4,584,071 A * | 4/1986 | Bissot | ............... | C25B 1/46 205/520 |
| 5,503,657 A * | 4/1996 | Bouard | ............... | C01B 6/34 257/E21.123 |
| 5,895,519 A * | 4/1999 | Lorimer | ............... | B01D 53/0431 95/116 |
| 5,935,393 A * | 8/1999 | Shinomiya | ............... | C25B 1/26 204/237 |
| 6,468,412 B2 * | 10/2002 | Bryan | ............... | C25B 1/26 204/242 |
| 7,001,446 B2 * | 2/2006 | Roark | ............... | B01D 53/228 55/524 |
| 7,658,834 B2 * | 2/2010 | Salerno | ............... | C02F 1/4674 204/228.3 |
| 7,662,218 B2 * | 2/2010 | Maeda | ............... | B01D 53/228 205/265 |
| 8,673,510 B2 * | 3/2014 | Pledger | ............... | B01D 53/22 429/416 |
| 9,593,053 B1 * | 3/2017 | McFarland | ............... | C25B 1/003 |
| 2005/0211567 A1 * | 9/2005 | Fleming | ............... | C25B 1/04 205/500 |
| 2007/0251831 A1 * | 11/2007 | Kaczur | ............... | C25B 1/46 205/510 |
| 2010/0044241 A1 * | 2/2010 | Pendleton | ............... | C25B 1/46 205/500 |
| 2010/0044242 A1 * | 2/2010 | Bhavaraju | ............... | C25B 1/46 205/556 |
| 2015/0111114 A1 * | 4/2015 | Nakayama | ............... | H01M 4/8605 429/405 |

* cited by examiner

HIGH CONCENTRATION BLEACH GENERATOR APPARATUS, SYSTEM AND METHOD OF USE

STATEMENT REGARDING FEDERALLY SPONSORED RESEARCH OR DEVELOPMENT

The invention described herein was made by employees of the United States Government and may be manufactured and used by the Government of the United States of America for governmental purposes without the payment of any royalties thereon or therefore.

BACKGROUND OF THE INVENTION

1. Field of Invention

This invention relates to the field of liquid purification or separation and more specifically to liquid purification with preliminary chemical manufacture.

2. Description of Related Art

Portable bleach generators find use in locations far from water treatment facilities or areas in which water treatment facilities are non-operational. Bleach created by bleach generators disinfects water for consumption. Portable bleach generators convert salt dissolved in water to chlorine bleach through an electrolytic process. Application of electrical potential to anode and cathode electrodes causes dissolved salt to convert into sodium hydroxide (NaOH), chlorine gas ($Cl_2$) and hydrogen gas ($H_2$). The generators then allow combination of the sodium hydroxide and chlorine gas to form sodium hypochlorite, a type of bleach. This bleach effectively disinfects drinking water.

However, the build-up of hydrogen gas byproducts within the generators reduces efficiency of bleach generation and creates a potential safety hazard. These portable bleach generators also require large amounts of electrical power, limiting their usefulness in the field. Furthermore, the processes used to generate bleach only produce low concentration bleach solutions of less than 2 weight percent, which may be inadequate for disinfecting drinking water.

There is an unmet need in the art for a portable bleach generator capable of safely venting hydrogen to increase electrical power use efficiency and generate higher concentrations of bleach.

BRIEF SUMMARY OF THE INVENTION

In one embodiment of the invention, a high concentration bleach generator apparatus includes a housing, a brine chamber, an anionic chamber, a cationic chamber, a hydrogen selective membrane and an electrical power source. The housing substantially encloses the brine chamber, the anionic chamber and the cationic chamber. The brine chamber includes a brine inlet and is substantially surrounded by the anionic chamber and the cationic chamber. The anionic chamber includes an anode electrode, an anionic chamber outlet and an anionic exchange membrane separating the anionic chamber from the brine chamber. The cationic chamber includes a cathode electrode, a cationic chamber inlet, a cationic chamber outlet and a cationic exchange membrane separating the cationic chamber from the brine chamber. The hydrogen selective membrane is in contact with at least the cationic chamber and an outside of the housing. The electrical power source is operatively connected to the anode electrode and to the cathode electrode.

In another embodiment of the invention, a high concentration bleach generator system includes at least one high concentration bleach generator apparatus as above, a system housing, at least one brine reservoir and a data processor. The system housing includes a reservoir port operatively coupled to a fill port of the brine reservoir and a bleach port operatively coupled to the cationic chamber outlet and a hydrogen vent. The system housing substantially encloses at least one high concentration bleach generator apparatus and at least one brine reservoir. The brine reservoir includes at least one reservoir outlet port operatively coupled to the brine inlet and an equalization port open to atmosphere. The data processor includes a user interface and a timer.

Still another embodiment of the invention is a method for creating bleach using a high concentration bleach generator apparatus. The method receives a volume of brine into a brine inlet of a brine chamber substantially surrounded by an anionic chamber and a cationic chamber, wherein the brine chamber, the anionic chamber and the cationic chamber are substantially enclosed by a housing. Next, the method provides electrical power from an electrical power source to an anode electrode in the anionic chamber and to a cathode electrode in the cationic chamber, wherein the electrical power source is operatively connected to the anode electrode and to the cathode electrode. The method then selectively allows passage of negatively charged ions from the brine chamber to the anionic chamber through an anionic exchange membrane separating the anionic chamber from the brine chamber. Next, the method selectively allows passage of positively charged ions from the brine chamber to the cationic chamber through a cationic exchange membrane separating the cationic chamber from the brine chamber. The method then conveys a chlorine gas stream from an anionic chamber outlet of the anionic chamber into cationic chamber inlet of the cationic chamber via a pump. Next, the method diffuses a hydrogen gas stream from the high concentration bleach generator apparatus through a hydrogen selective membrane in contact with at least the cationic chamber and an outside of the housing. The method then combines the chlorine gas stream with an alkali and alkaline hydroxide mass in the cationic chamber to create a bleach stream.

BRIEF DESCRIPTION OF SEVERAL VIEWS OF THE DRAWING(S)

TERMS OF ART

As used herein, the term "bleach" means an alkali and alkaline hypochlorite solution.

As used herein, the term "brine" means an inorganic alkali and alkaline chloride salt solution.

As used herein, the term "selective membrane" means a thin layer of polymer or ceramic material selectively allowing transport from one side to the other of selected charged, partially charged or uncharged species or ions based on charge and/or size.

DETAILED DESCRIPTION OF THE INVENTION

Figures 1A, 1B:
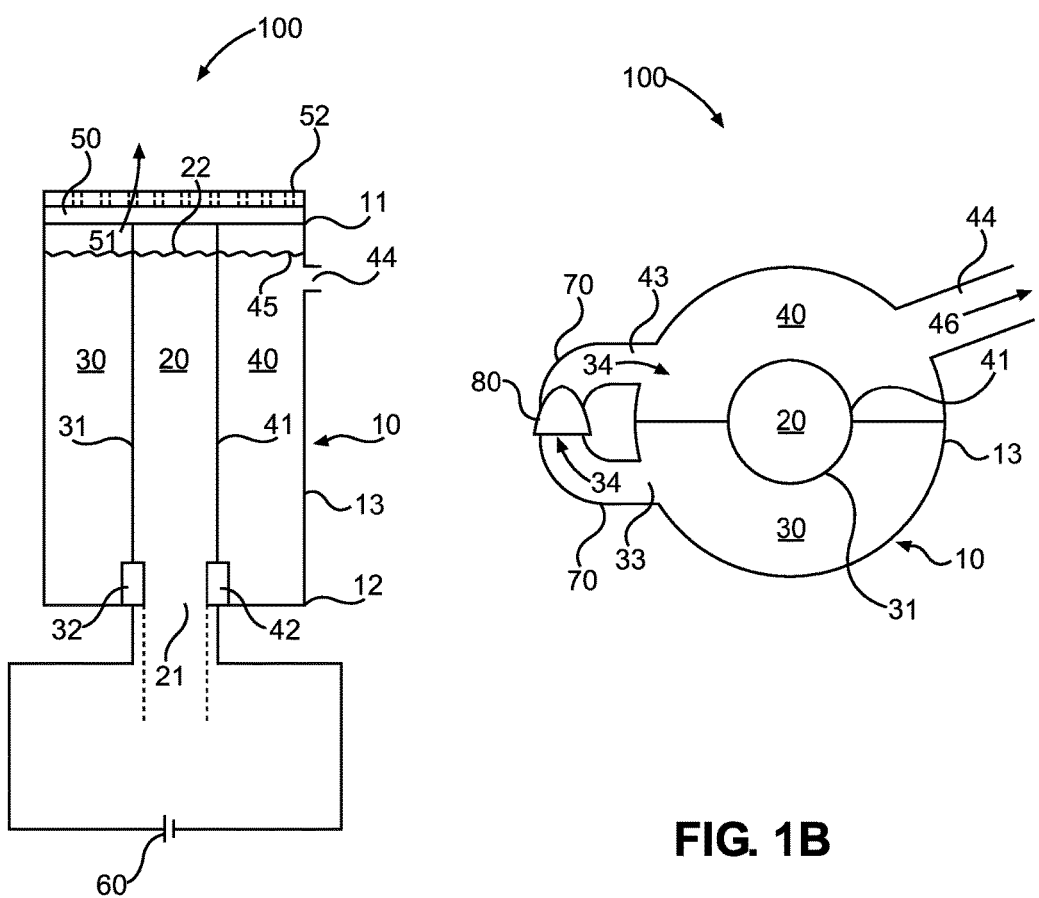
FIGS. 1a and 1b illustrate side and top schematic views, respectively, of an exemplary embodiment of a high concentration bleach generator.

FIGS. 1a and 1b illustrate side and top schematic views, respectively, of an exemplary embodiment of a high concentration bleach generator 100. High concentration bleach generator 100 includes a housing 10, a brine chamber 20, an anionic chamber 30, a cationic chamber 40, a hydrogen selective membrane 50, an electrical power source 60, tubing 70 and a pump 80.

Housing 10 substantially encloses brine chamber 20, anionic chamber 30 and cationic chamber 40. In the exemplary embodiment, housing 10 is made of a lightweight, non-reactive material such as a polymer. In certain embodiments, the polymer may be translucent to allow for visual observation of bleach generation. Housing 10 has an upper end 11, a lower end 12 and a sidewall 13. In the exemplary embodiment, hydrogen selective membrane 50 closes upper end 11. In other embodiments, hydrogen selective membrane 50 closes an aperture in sidewall 13 or a portion of upper end 11 above cationic chamber 40.

In the exemplary embodiment, brine chamber 20 is located within housing 10, at least partially surrounded by anionic chamber 30 and cationic chamber 40. Brine chamber 20 includes a brine inlet 21. Brine inlet 21 allows passage of additional brine 22 into brine chamber 20. In the exemplary embodiment, brine 22 is a solution of water and sodium chloride.

In the exemplary embodiment, anionic chamber 30 includes an anionic exchange membrane 31, at least one anode electrode 32, an anionic chamber outlet 33 and a chlorine gas stream 34. Anionic exchange membrane 31 separates brine chamber 20 from anionic chamber 30 and selectively allows passage of negatively charged ions from brine chamber 20 to anionic chamber 30. These negatively charged ions may include, but are not limited to, chlorine ions.

Anode electrode 32 can be made from any suitably non-oxidizable and conductive material, such as steel, titanium, alloys or oxides thereof, or superconductors. Anode electrode 32 may also comprise or have a coating of a noble metal, including but not limited to platinum, palladium, gold, copper, silver, iridium, osmium, cadmium, indium, bismuth, tungsten, zirconium, alloys or oxides thereof, or any other suitable electrode material. In the exemplary embodiment, anode electrode 32 is made of noble metals, alloys or oxides thereof.

Anode electrode 32 can have any suitable shape, such as, but not limited to flat plates, coaxial plates, rods, circular or spiral construction, or a combination thereof. Anode electrode 32 can have any suitable construction, such as, but not limited to a solid construction, a surface-patterned construction or a non-solid construction with one or more apertures, such as a metallic porous mesh. In an exemplary embodiment, anode electrode 32 is a highly interconnected, metallic foam-like structure. Such structures may have a surface area to volume ratio of approximately 100:1 to approximately 1,000,000:1.

In the exemplary embodiment, anionic chamber outlet 33 permits operative connection of cationic chamber 40 and anionic chamber 30, allowing chlorine gas stream 34 to flow from anionic chamber 30 to cationic chamber 40.

In the exemplary embodiment, cationic chamber 40 includes a cationic exchange membrane 41, at least one cathode electrode 42, a cationic chamber inlet 43, a cationic chamber outlet 44, an alkali and alkaline hydroxide mass 45 and a bleach stream 46. Cationic exchange membrane 41 separates brine chamber 20 from cationic chamber 40 and selectively allows passage of positively charged ions from brine chamber 20 to cationic chamber 40. These positively charged ions may include, but are not limited to, sodium ions. These positively charged ions form alkali and alkaline hydroxide mass 45.

Cathode electrode 42 can be made from any suitably non-reducible and conductive material, such as steel, titanium, alloys or oxides thereof, or superconductors. Cathode electrode 42 may also comprise or have a coating of a noble metal, including but not limited to platinum, palladium, gold, copper, silver, iridium, osmium, cadmium, indium, bismuth, tungsten, zirconium, alloys or oxides thereof, or any other suitable electrode material. In the exemplary embodiment, cathode electrode 42 is made of noble metals, alloys or oxides thereof.

Cathode electrode 42 can have any suitable shape, such as, but not limited to flat plates, coaxial plates, rods, circular or spiral construction, or a combination thereof. Cathode electrode 42 can have any suitable construction, such as, but not limited to a solid construction, a surface-patterned construction or can have one or more apertures, such as a metallic porous mesh. In an exemplary embodiment, cathode electrode 42 is a highly interconnected, metallic foam-like structure. Such structures may have a surface to volume area ratio of approximately 100:1 to approximately 1,000,000:1.

Cationic chamber inlet 43 operatively connects cationic chamber 40 and anionic chamber 30, allowing influx of chlorine gas stream 34 from anionic chamber 30. Combination of chlorine gas stream 34 with alkali and alkaline hydroxide mass 45 in cationic chamber 40 creates bleach stream 46. Cationic chamber outlet 44 permits passage of bleach stream 46 out of housing 10 and cationic chamber 40.

Hydrogen removal membrane 50 allows hydrogen gas stream 51 to selectively diffuse out of high concentration bleach generator 100 into the atmosphere or other containment and/or treatment systems. In the exemplary embodiment, hydrogen selective membrane 50 closes upper end 11 of housing 10. In other embodiments, hydrogen selective membrane 50 closes an aperture in sidewall 13 or a portion of upper end 11 above cationic chamber 40. In the exemplary embodiment, hydrogen selective membrane 50 is a sulfonated tetrafluoroethylene based fluoropolymer-copolymer.

Hydrogen selective membrane 50 performs membrane gas separation at pressures less than or equal to approximately 14 psig. As a result, hydrogen selective membrane 50 has a tensile strength of greater than or equal to approximately 14 psi. Within high concentration bleach generator 100, chlorine gas stream 34 and hydrogen gas stream 51 are present as a mixture of gases. In a mixture of gases, each gas has a partial pressure that is the hypothetical pressure of that gas if it alone occupied the volume of the mixture at the same temperature. The total pressure of an ideal gas mixture is the sum of the partial pressures of each individual gas in the mixture. The pressure of hydrogen gas stream 51 ranges from approximately 5 percent to approximately 6 percent of the total gas pressure within high concentration bleach generator 100. The pressure of chlorine gas stream 34 ranges from approximately 94 percent to approximately 95 percent of the total gas pressure. Additional reaction gaseous byproducts, such as oxygen ($O_2$) and hydrogen chloride (HCl) may form a partial pressure of approximately 0 percent to approximately 1 percent of the total gas pressure within high concentration bleach generator 100.

In the exemplary embodiment, a membrane cover 52 secures hydrogen selective membrane 50 to housing 10 and increases the pressure that may be applied to hydrogen selective membrane 50. Membrane cover 52 has an apertured, woven, lattice or mesh configuration allowing escape of hydrogen gas stream 51.

Electrical power source 60 electrically connects to anode electrode 32 and cathode electrode 42 at opposite terminals. Electrical power source 60 can provide a constant DC output voltage, a pulsed or otherwise modulated DC output voltage, or a pulsed or otherwise modulated AC output voltage to anode electrode 32 and cathode electrode 42. In the exemplary embodiment, the voltage of electrical power source 60 ranges from approximately 3 V to approximately 24 V with presently existing electrodes; however, as newer electrode technology develops the voltage range could be lower. Other embodiments may use voltages of up to approximately 120 V. Altering the applied voltage controls the rate of production of chlorine gas stream 34 generated in anionic chamber 30.

Tubing 70 interconnects anionic chamber outlet 33, pump 80 and cationic chamber inlet 43. Pump 80 pumps chlorine gas stream 34 from anionic chamber outlet 33 to cationic chamber inlet 43.

Figure 2:
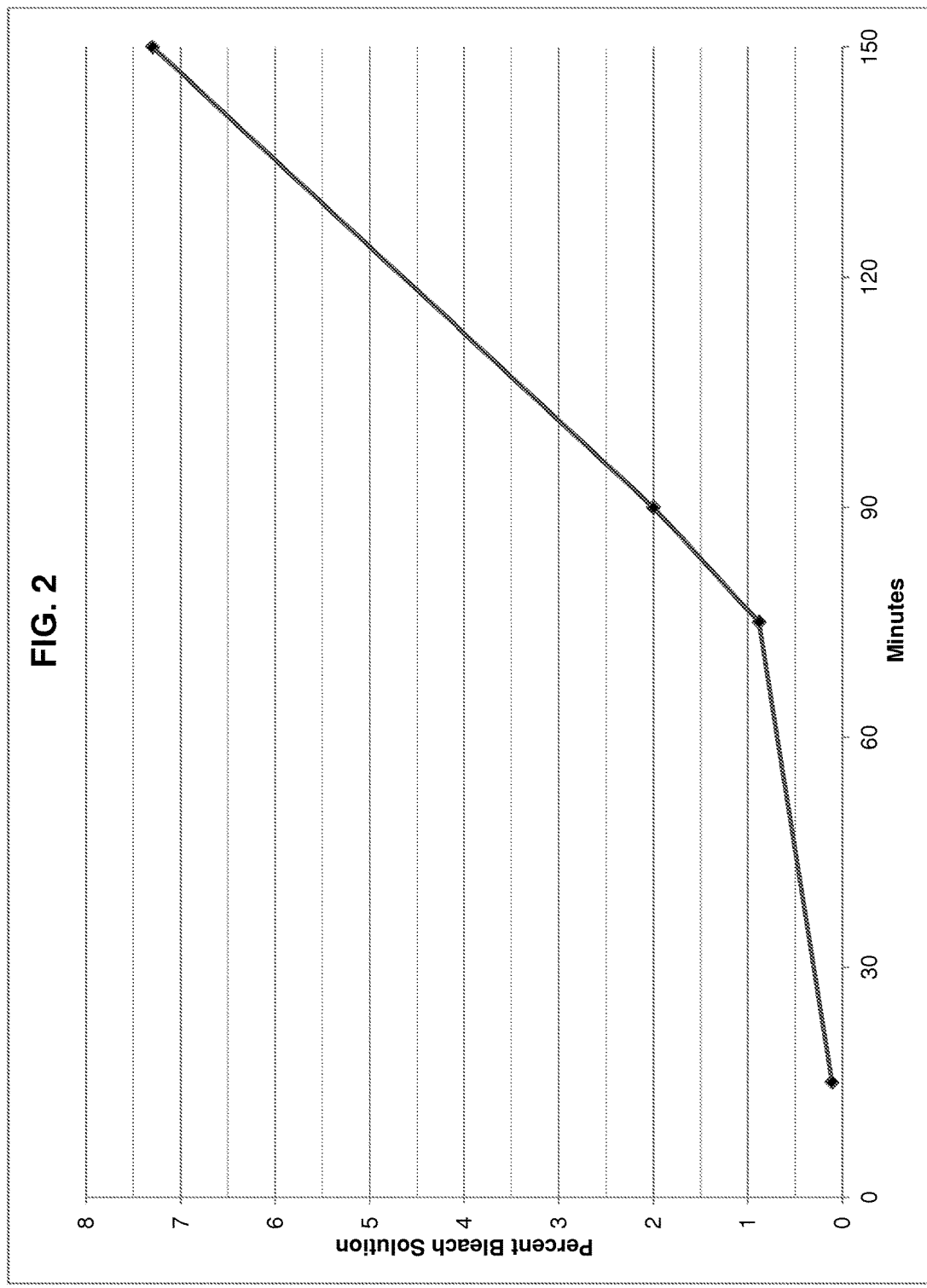
FIG. 2 is a plot showing operational data of an exemplary embodiment of a high concentration bleach generator.

FIG. 2 is a plot showing operational data of an exemplary embodiment of a high concentration bleach generator 100. High concentration bleach generator 100 creates a high concentration bleach solution. In the exemplary embodiment shown, high concentration bleach generator 100 demonstrates the ability to generate an approximately 7.3 weight percent bleach solution after only two and a half hours of run time.

Figure 3:
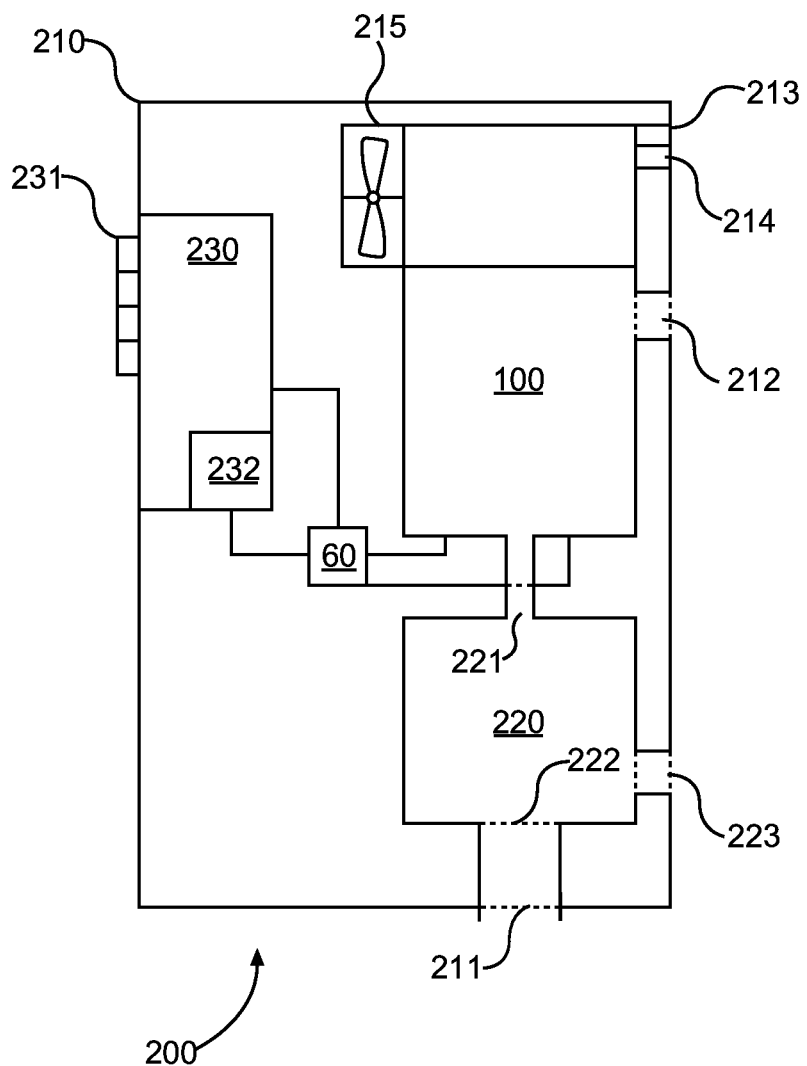
FIG. 3 illustrates a top schematic view of an exemplary embodiment of a high concentration bleach generator system.

FIG. 3 illustrates a top schematic view of an exemplary embodiment of a high concentration bleach generator system 200. High concentration bleach generator system 200 includes at least one high concentration bleach generator 100, a system housing 210, at least one brine reservoir 220 and a data processor 230.

System housing 210 substantially encloses high concentration bleach generator 100 and at least one brine reservoir 220. In the exemplary embodiment, system housing 210 also encloses at least part of data processor 230. System housing 210 includes at least one reservoir port 211 operatively coupled to brine reservoir 220 to allow refilling of brine reservoir 220. System housing 210 also includes at least one bleach port 212 operatively coupled to cationic chamber outlet 44 to allow a user to draw off bleach stream 46. System housing 210 also includes at least one hydrogen vent 213 for venting off hydrogen gas stream 51. In the exemplary embodiment, hydrogen vent 213 includes a one-way valve 214 to prevent hydrogen from reentering system housing 210. Optionally, system housing 210 also includes a fan 216 exhausting hydrogen gas stream 51.

Brine reservoir 220 contains additional brine 22 and operatively connects to brine inlet 21 at reservoir outlet port 221, allowing passage of additional brine 22 into brine chamber 20. Brine reservoir 220 also includes at least one fill port 222 operatively coupled to reservoir port 211 and at least one equalization port 223 open to the atmosphere, preventing formation of a vacuum. Brine reservoir 220 has a maximum capacity of approximately 2 L to approximately 4 L, approximately 2 to 3 times the size of brine chamber 20.

The rate of bleach production is proportional to the voltage, brine salt content and time, and inversely proportional to temperature. Materials forming brine reservoir 220 include, but are not limited to, polymers, titanium and other non-corroding materials.

Data processor 230 includes a user interface 231 and a timer 232. In use, a user may enter a desired bleach concentration on user interface 231. Data processor 230 is configured with software that calculates and transmits to timer 232 the amount of time required to produce such a bleach concentration using at least one high concentration bleach generator 100. Timer 232 operatively interconnects electrical power source 60 to high concentration bleach generator 100, providing electrical power to high concentration bleach generator 100 for the given amount of time necessary to generate the desired bleach concentration. Data processor 230 is also configured with software that calculates and controls the voltage of electrical power source 60 based on the desired bleach concentration.

Figure 4:
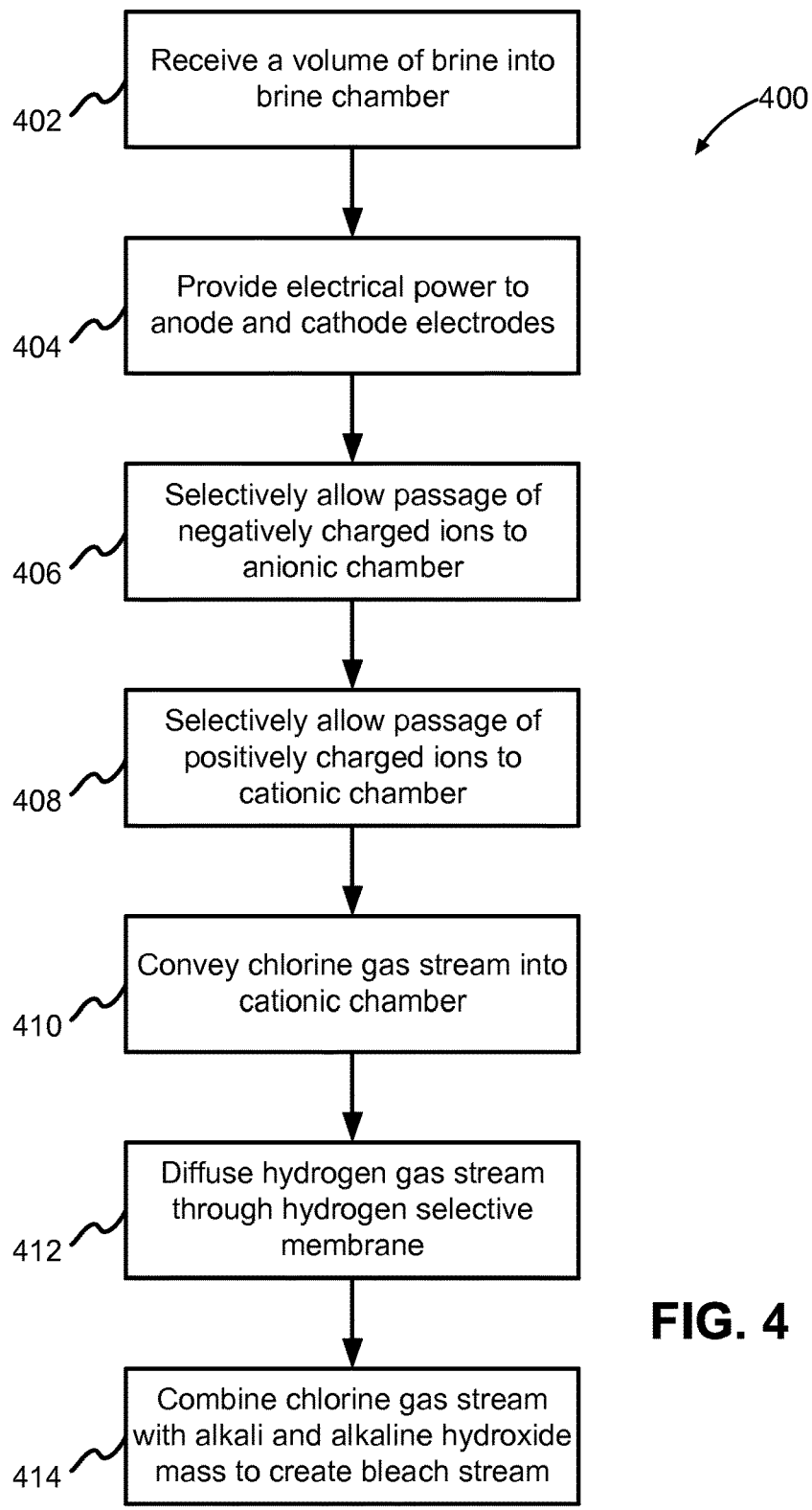
FIG. 4 is a flowchart of a method for using an exemplary embodiment of a high concentration bleach generator.

FIG. 4 is a flowchart of a method 400 for using an exemplary embodiment of high concentration bleach generator 100.

In step 402, high concentration bleach generator 100 receives a volume of brine 22 into brine chamber 20.

In step 404, electrical power source 60 provides electrical power to anode electrode 32 and cathode electrode 42.

In step 406, anionic exchange membrane 31 selectively allows passage of negatively charged ions from brine chamber 20 to anionic chamber 30.

In step 408, cationic exchange membrane 41 selectively allows passage of positively charged ions from brine chamber 20 to cationic chamber 40. Steps 406 and 408 may be performed simultaneously.

In step 410, pump 80 conveys chlorine gas stream 34 from anionic chamber 30 into cationic chamber 40.

In step 412, hydrogen gas stream 52 diffuses from high concentration bleach generator 100 through hydrogen selective membrane 50. Steps 410 and 412 may be performed simultaneously.

In step 414, chlorine gas stream 34 combines with alkali and alkaline hydroxide mass 45 in cationic chamber 40 to create bleach stream 46.

It will be understood that many additional changes in the details, materials, procedures and arrangement of parts, which have been herein described and illustrated to explain the nature of the invention, may be made by those skilled in the art within the principle and scope of the invention as expressed in the appended claims.

It should be further understood that the drawings are not necessarily to scale; instead, emphasis has been placed upon illustrating the principles of the invention. Moreover, the terms "substantially" or "approximately" as used herein may be applied to modify any quantitative representation that could permissibly vary without resulting in a change in the basic function to which it is related.

What is claimed is:

1. A high concentration bleach generator apparatus comprising:
    a housing, wherein said housing substantially encloses a brine chamber, an anionic chamber and a cationic chamber;
    said brine chamber comprising a brine inlet, wherein said brine chamber is substantially surrounded by said anionic chamber and said cationic chamber,
    said anionic chamber comprising an anode electrode, an anionic chamber outlet and an anionic exchange membrane separating said anionic chamber from said brine chamber;

said cationic chamber comprising a cathode electrode, a cationic chamber inlet, a cationic chamber outlet and a cationic exchange membrane separating said cationic chamber from said brine chamber;

a hydrogen selective membrane in contact with at least said cationic chamber and an outside of said housing; and an electrical power source operatively connected to said anode electrode and to said cathode electrode.

2. The apparatus of claim 1 wherein at least one of said anode electrode and said cathode electrode comprises material selected from the group consisting of: steel, titanium, superconductors, noble metals, and alloys or oxides thereof.

3. The apparatus of claim 1 wherein at least one of said anode electrode and said cathode electrode has a surface area to volume ratio ranging from approximately 100:1 to approximately 1,000,000:1.

4. The apparatus of claim 1 wherein at least one of said anode electrode and said cathode electrode has a solid construction.

5. The apparatus of claim 1 wherein at least one of said anode electrode and said cathode electrode has a non-solid construction.

6. The apparatus of claim 5 wherein at least one of said anode electrode and said cathode electrode has porous mesh or highly interconnected foam-like construction.

7. The apparatus of claim 1 wherein at least one of said anode electrode and said cathode electrode has a shape selected from the group consisting of: flat plates, coaxial plates, rods, circular, spiral and a combination thereof.

8. The apparatus of claim 1 wherein said hydrogen selective membrane is a sulfonated tetrafluoroethylene based fluoropolymer-copolymer.

9. The apparatus of claim 1 wherein said hydrogen selective membrane has a tensile strength of greater than or equal to approximately 14 psi.

10. The apparatus of claim 1 wherein said hydrogen selective membrane further comprises a membrane cover having an apertured, woven, lattice or mesh configuration.

11. The apparatus of claim 1 wherein said hydrogen selective membrane is positioned at the top of said housing.

12. The apparatus of claim 1 wherein said hydrogen selective membrane is positioned at the side of said housing.

13. The apparatus of claim 1 further comprising a pump operatively coupled between said anionic chamber outlet and said cationic chamber inlet, wherein said pump is configured to pump a chlorine gas stream into said cationic chamber.

14. The apparatus of claim 13 wherein said chlorine gas stream has a partial pressure ranging from approximately 94 percent to approximately 95 percent of a total gas pressure within said apparatus.

15. The apparatus of claim 1 further comprising a hydrogen stream, wherein said hydrogen gas stream has a partial pressure ranging from approximately 6 percent to approximately 5 percent of a total gas pressure within said apparatus.

16. A high concentration bleach generator system comprising:

at least one high concentration bleach generator apparatus comprising:

a housing, wherein said housing substantially encloses a brine chamber, an anionic chamber and a cationic chamber, said brine chamber comprising a brine inlet, wherein said brine chamber is substantially surrounded by said anionic chamber and said cationic chamber, said anionic chamber comprising an anode electrode, an anionic chamber outlet and an anionic exchange membrane separating said anionic chamber from said brine chamber, said cationic chamber comprising a cathode electrode, a cationic chamber inlet, a cationic chamber outlet and a cationic exchange membrane separating said cationic chamber from said brine chamber, a hydrogen selective membrane in contact with at least said cationic chamber and an outside of said housing, and an electrical power source operatively connected to said anode electrode and to said cathode electrode;

a system housing having a reservoir port operatively coupled to a fill port of at least one brine reservoir, a bleach port operatively coupled to said cationic chamber outlet and a hydrogen vent, wherein said housing substantially encloses said at least one high concentration bleach generator apparatus and said at least one brine reservoir;

said at least one brine reservoir having at least one reservoir outlet port operatively coupled to said brine inlet and an equalization port open to atmosphere; and a data processor having a user interface and a timer.

17. The system of claim 16, wherein said hydrogen vent comprises a one-way valve.

18. The system of claim 16, wherein said data processor is configured with software to calculate and transmit to said timer an amount of time required to produce a bleach concentration entered on said user interface, wherein said data processor is configured with software to calculate and control a voltage of said electrical power source required to produce said bleach concentration entered on said user interface.

19. The system of claim 16, wherein said timer operatively interconnects said electrical power source to said high concentration bleach generator.

20. A method for creating bleach using a high concentration bleach generator apparatus, comprising the steps of:

receiving a volume of brine into a brine inlet of a brine chamber substantially surrounded by an anionic chamber and a cationic chamber, wherein said brine chamber, said anionic chamber and said cationic chamber are substantially enclosed by a housing;

providing electrical power from an electrical power source to an anode electrode in said anionic chamber and to a cathode electrode in said cationic chamber, wherein said electrical power source is operatively connected to said anode electrode and to said cathode electrode;

selectively allowing passage of negatively charged ions from said brine chamber to said anionic chamber through an anionic exchange membrane separating said anionic chamber from said brine chamber;

selectively allowing passage of positively charged ions from said brine chamber to said cationic chamber through a cationic exchange membrane separating said cationic chamber from said brine chamber;

conveying a chlorine gas stream from an anionic chamber outlet of said anionic chamber into cationic chamber inlet of said cationic chamber via a pump;

diffusing a hydrogen gas stream from said high concentration bleach generator apparatus through a hydrogen selective membrane in contact with at least said cationic chamber and an outside of said housing; and combining said chlorine gas stream with an alkali and alkaline hydroxide mass in said cationic chamber to a create bleach stream.

\* \* \* \* \*